United States Patent
Thurner et al.

(10) Patent No.: US 10,215,531 B2
(45) Date of Patent: Feb. 26, 2019

(54) TESTING SYSTEM FOR OPTICAL AIMING SYSTEMS WITH LIGHT EMITTER SYSTEMS INCLUDING TESTING SYSTEM FOR THERMAL DRIFT AND RELATED METHODS

(71) Applicant: The United States of America as represented by the Secretary of the Navy, Washington, DC (US)

(72) Inventors: Matthew Thurner, Bloomfield, IN (US); Brandon Clarke, Bloomington, IN (US); Ronald A Volpone, Dayton, OH (US); David Scot Curry, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 31 days.

(21) Appl. No.: 15/435,348

(22) Filed: Feb. 17, 2017

(65) Prior Publication Data
US 2017/0307331 A1    Oct. 26, 2017

Related U.S. Application Data

(60) Provisional application No. 62/324,939, filed on Apr. 20, 2016.

(51) Int. Cl.
*F41G 1/54*    (2006.01)
*G01M 99/00*   (2011.01)

(52) U.S. Cl.
CPC ............. *F41G 1/54* (2013.01); *G01M 99/002* (2013.01)

(58) Field of Classification Search
CPC ..... G01M 99/002; G01M 11/00; G01M 11/08; F41G 1/54; G02B 27/32
See application file for complete search history.

(56) References Cited

U.S. PATENT DOCUMENTS 4,698,477 A * 10/1987 Aramaki ............... B23H 11/00
                                               219/69.1
4,928,019 A *  5/1990 Tomikawa ............ B23Q 15/18
                                               250/559.3

(Continued)

FOREIGN PATENT DOCUMENTS

CN    204101008 U  *  1/2015
JP    2004200312 A  *  7/2004
RU    2535584 C1   * 12/2014

OTHER PUBLICATIONS

Machine generated translation of CN-204101008 U, Yu, (Year: 2015).*
English Abstract, RU-2535584 C1, Aksenov, (Year: 2014).*

*Primary Examiner* — David E Harvey
(74) *Attorney, Agent, or Firm* — Christopher A. Monsey

(57) ABSTRACT

Exemplary testing systems and methods are provided including a system configured to test for thermal drift of a unit under test (UUT) under various temperature or environmental conditions and generating an output including visual or data on the thermal drift, if any. The methods involve attaching a UUT to a mounting device within a thermally controlled chamber, collimating light received from a UUT, recording the resulting images, and comparing the results at different temperatures to determine how much thermal drift has occurred. In addition, there are testing apparatuses capable of performing the tests.

16 Claims, 24 Drawing Sheets

(56) References Cited

U.S. PATENT DOCUMENTS

| | | | | |
|---|---|---|---|---|
| 5,031,349 A | * | 7/1991 | Vogel | F41G 1/54 356/153 |
| 5,410,815 A | * | 5/1995 | Parikh | F41A 33/02 33/275 R |
| 2001/0042335 A1 | * | 11/2001 | Strand | F41A 33/02 42/116 |
| 2007/0020785 A1 | * | 1/2007 | Bruland | B23K 26/043 438/16 |
| 2008/0186831 A1 | * | 8/2008 | Tukker | G11B 7/1369 369/112.01 |
| 2009/0027753 A1 | * | 1/2009 | Lizotte | G02B 27/0927 359/238 |
| 2009/0242531 A1 | * | 10/2009 | Baird | B23K 26/0853 219/121.81 |
| 2009/0245318 A1 | * | 10/2009 | Clifford, Jr. | B23K 26/046 372/107 |
| 2011/0219658 A1 | * | 9/2011 | AlKandari | F41G 1/54 42/116 |
| 2015/0345905 A1 | * | 12/2015 | Hancosky | F41G 1/35 42/113 |

\* cited by examiner

STEP 221: PROVIDING A TESTING SYSTEM SUCH AS, E.G. IN FIG. 1 SUCH AS FOR EXAMPLE, INCLUDING A SUPPORT STRUCTURE; A LOW THERMAL EXPANSION MATERIAL RAIL WITH MOUNTING STRUCTURES COUPLED WITH THE SUPPORT STRUCTURE, SAID MOUNTING STRUCTURES CONFIGURED TO RECEIVE AND RETAIN AN OPTICAL SIGHT SYSTEM CONFIGURED TO GENERATE A LIGHT SIGNAL ALONG AN OPTICAL PATH; A THERMAL CHAMBER WITH A CONTROLS SYSTEM AND A HEATING AND COOLING SYSTEM CONFIGURED TO ATTAIN AND MAINTAIN A PREDETERMINED TEMPERATURE IN THE THERMAL CHAMBER, WHEREIN THE THERMAL CHAMBER IS CONFIGURED WITH AN APERTURE CONFIGURED TO RECEIVE AND PASS THROUGH A PORTION OF THE LOW THERMAL EXPANSION MATERIAL RAIL INTO THE THERMAL CHAMBER, SAID THERMAL CHAMBER FURTHER COMPRISES A TRANSPARENT SECTION ADAPTED TO PERMIT THE LIGHT SIGNAL TO PASS THROUGH THE TRANSPARENT SECTION ALONG THE OPTICAL PATH; A DRY AIR EXPANSION CHAMBER COUPLED OR DISPOSED IN RELATIONSHIP TO SAID THERMAL CHAMBER AND SURROUNDING A PORTION OF SAID OPTICAL PATH EXITING SAID TRANSPARENT SECTION TO PERMIT SAID LIGHT SIGNAL TO PASS THROUGH SAID DRY AIR EXPANSION CHAMBER, WHEREIN THE DRY AIR EXPANSION WINDOW IS CONFIGURED TO MAINTAIN A TEMPERATURE TO PREVENT FOGGING OR CONDENSATION ON SAID TRANSPARENT SECTION; AN OPEN AIR REFLECTIVE COLLIMATOR POSITIONED IN SAID OPTICAL PATH EXISTING SAID DRY AIR EXPANSION CHAMBER AND REDIRECTING SAID LIGHT SIGNAL TO A SECOND OPTICAL PATH; A CAMERA IMAGER SYSTEM CONFIGURED TO RECEIVE SAID LIGHT SIGNAL ALONG SAID SECOND OPTICAL PATH AND CONVERT SAID LIGHT SIGNAL INTO A PLURALITY OF ELECTRONIC OR DIGITAL SIGNALS; AND A TEST CONTROL AND PROCESSING SYSTEM COUPLED WITH THE CAMERA IMAGER SYSTEM ADAPTED TO RECEIVE SAID PLURALITY OF ELECTRONIC SIGNALS OR DIGITAL SIGNALS, RECORD SAID ELECTRONIC SIGNALS OR DIGITAL SIGNALS, AND THEN PERFORM IMAGE PROCESSING COMPRISING NOISE REDUCTION, LOCATING A CENTROID OF EACH IMAGE CAPTURE OF SAID LIGHT SIGNAL, DETERMINING A THERMAL DRIFT OF THE LIGHT SIGNAL IN THE IMAGE CAPTURES, AND GENERATING AN OUTPUT REPORT ON AN OUTPUT SYSTEM COMPRISING A GRAPHIC OR DATA SHOWING A COMPARISON OF THE LIGHT SIGNALS IN AT LEAST SOME SELECTED IMAGE CAPTURES OF SAID LIGHT SIGNAL.

STEP 223: MOUNTING AN OPTICAL SIGHT SYSTEM TO THE LOW THERMAL EXPANSION MATERIAL RAIL OF, E.G., FIG. 1

STEP 225: GENERATING A LIGHT SIGNAL WITH THE OPTICAL SIGHT SYSTEM UNDER TEST SHOWN IN E.G., FIG. 1

STEP 227: USING THE TTC TO ADJUST A TEMPERATURE WITHIN THE TTC TO A PLURALITY OF TESTING TEMPERATURES FOR A FINITE DURATION AT EACH TESTING TEMPERATURE

TESTING SYSTEM FOR OPTICAL AIMING SYSTEMS WITH LIGHT EMITTER SYSTEMS INCLUDING TESTING SYSTEM FOR THERMAL DRIFT AND RELATED METHODS

CROSS-REFERENCE TO RELATED APPLICATIONS

The present application claims priority to U.S. Provisional Patent Application Ser. No. 62/324,939, filed Apr. 20, 2016, entitled "TESTING SYSTEM FOR OPTICAL AIMING SYSTEMS WITH LIGHT EMITTER SYSTEMS INCLUDING TESTING SYSTEM FOR THERMAL DRIFT AND RELATED METHODS," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,357) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to systems and methods for evaluating optical systems, parts or systems for tampering, defective design, fraudulent representations of capability, specification misrepresentation, or counterfeit parts.

Some embodiments can be used for evaluating defective or misrepresentations of specification compliance. For example, the Government could use the invention to determine if a supplier of military and/or government agency optics knowingly sold defective optics such as optics including red-dot sights. Defects can include a condition referred to as thermal drift where the sight's point of aim differs from its point of impact when exposed to temperature changes. For example, a gun that was sighted in the morning at 50 degrees F. would not hold accurate when the temperature ranged up to 100 degrees F. by the afternoon. After learning of this problem, it was necessary to quantifiably test optics to determine if they have the thermal drift condition.

One existing method of testing for thermal drift includes placing a sight in a freezer or heating chamber, pulling the sight out, putting it on a firearm, and firing at a target. One problem with this existing method includes not accounting for the temperature of the firearm or sight mounting rail where the sight is attached. Repeatability of results is impeded due to the need to take the sight on and off the firearm or its mounting rail (requires re-zeroing of the sight, etc.). If a testing environment has experienced a thermal change, a platform the sight or device is attached to will also have experienced some changes due to expansion or contraction of the materials.

Embodiments of the invention address significant problems with various existing methods for testing thermal stability of a sight or other visual augmentation devices (e.g., magnified optics or lasers). Testing based on heating then cooling then firing of a firearm introduces additional variables that are not repeatable in a laboratory setting. For example, various factors impacting such testing include sight picture, trigger squeeze, breath holding, density altitude, bullet quality, allowable dispersion from lot-to-lot in ammunition, etc. This type of test method is very heavily reliant on the skill of the user and other environmental factors.

In one exemplary embodiment of the present disclosure, an exemplary mounting rail is disposed inside of an exemplary thermal chamber along with a unit under test (UUT), e.g., visual augmentation device or sight. Such a mounting rail can be formed from a dense material that is resistant to thermal changes, but if its position changes due to thermal expansion, this expansion or movement will be minimal (e.g., within an error budget).

Exemplary embodiments of this disclosure substantially reduce or eliminate human factors in process controls associated with various types of in-situ testing. Reductions of errors can approach or exceed an order of magnitude or better in measurement resolution, repeatability, and reliability results. Various embodiments provide a capability for evaluating parts or systems to characterize performance of a device or system under test which can be useful for a variety of evaluations. Exemplary evaluations can include evaluating for specification adherence, tampering, misrepresentation, defects, fraudulent claims or counterfeit parts. In particular, various exemplary systems and methods are provided including test stations and methods for quantifying thermal drift or establishing thermal stability of visual augmentation systems, such as red dot sights, lasers, etc.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Various embodiments of the invention include test procedures and systems for testing and characterizing the thermal drift for various visual augmentation systems, e.g., visual augmentation weapons accessories (VASWA) devices, across their full operating temperature range. These VASWA devices will hereafter be referred to as UUTs. One objective of testing can include ensuring that delivered items meet the thermal drift requirements of a contract or product specification and do not shift boresight or alignment when subjected to changing temperatures.

Figure 1:
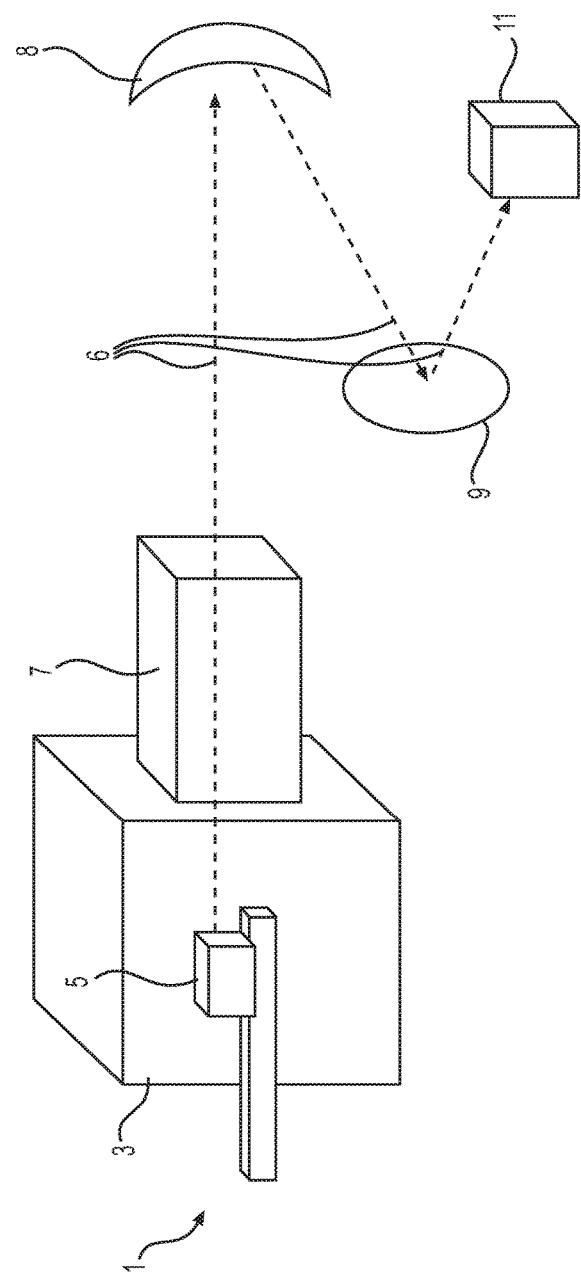
FIG. 1 shows an exemplary simplified test system for evaluating UUT parts or systems to characterize thermal drift or thermal stability performance.

Referring initially to FIG. 1, an exemplary system for testing UUTs 5 in accordance with one embodiment of the invention is shown. UUTs can include optical sights, telescopic aiming devices with a reticle, holographic red dot sight, optical reticle aiming devices, reflexive sight, laser aiming device, beam system used as a part of an aiming system, reticle projection system, laser sight, etc. A thermal or temperature chamber (TTC) 3 is shown which receives a mounting rail 1 made with temperature insensitive material (e.g., a MIL-STD-1913) dimensioned mounting rail made from low coefficient of thermal expansion (CTE) material (e.g., an Invar (FeNi36) rail) inserted therein. Exemplary CTE can include a CTE of $1.2 \times 10^{-6}$ $K^{-1}$. An aluminum material was attempted for use in an embodiment of the invention but it was found to have too high a CTE (e.g., $24 \times 10^{-6}$ $K^{-1}$). The exemplary Invar mounting rail 1 has a UUT 5 mounted on a distal section of the mounting rail 1 passing through a test system mounting rail aperture (not shown, but see FIG. 4, 45) into and disposed within the TTC 3. The exemplary UUT 5 includes a light or laser generator (not shown) that is oriented to pass a light or laser beam optical path 6 out of the thermal chamber 3 (e.g., through a glass window 4 not shown) into a dry air expansion chamber 7 coupled to the TTC 3 where the optical path 6 (e.g., light or laser beam) is directed onto an open air reflexive collimator mirror 8 and reflected into a reflecting mirror 9. The reflecting mirror 9 then directs the light or laser beam optical path 6 into a video or digital camera 11. A test control system (not shown) includes a processor, input/output device, display system, user interface (e.g., keyboard, mouse, etc.) and a software storage medium such as a hard drive which stores an operating system and test related software including an infrared signal analysis system, e.g., IRWin, on the test control system. The exemplary test control system (not shown) operates the camera 11 settings and image capture of UUT 5 output (e.g., aiming dot, reticle, laser dot, etc.).

Testing can include measurements for thermal drift associated with the light or laser generator in the UUT 5 that can be measured across a designated temperature cycle starting at ambient or room/chamber temperature, then down to a low temperature setting for a soak of a designated duration, then up to a high temperature setting for a soak of a designated duration, and back to ambient temperature. At each temperature soak, the UUT's 5 output, e.g., reticle position, will be documented via image capture from the camera 11 and test related software (e.g., IRWin). If a temperature soak duration is not specified, an exemplary duration, e.g., a two hour soak, can be used.

Figure 2:
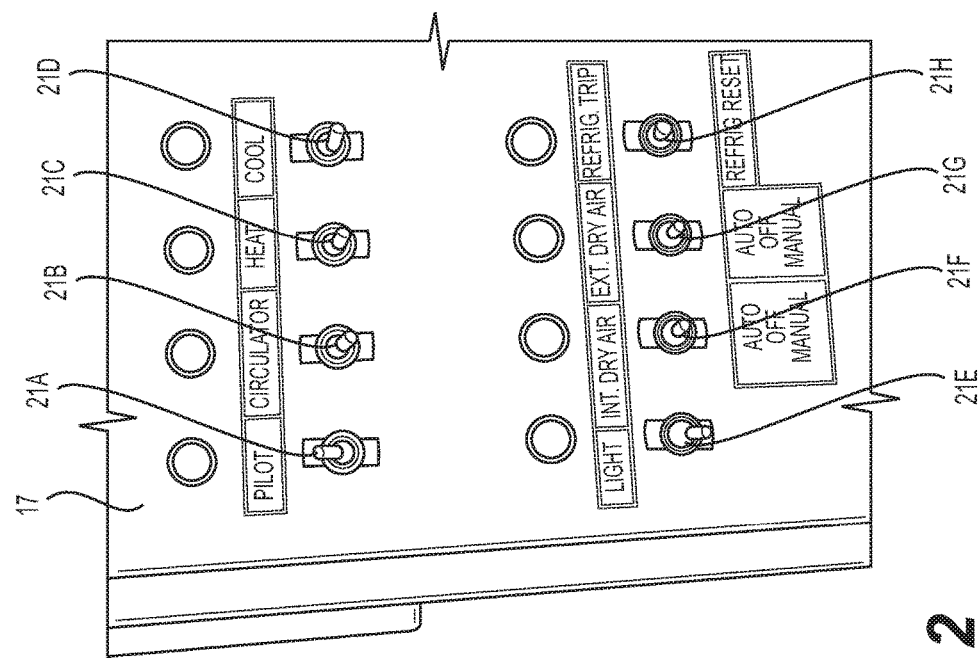
FIG. 2 shows an exemplary main power and thermal chamber main panel used with an exemplary system such as shown in FIG. 1.

FIG. 2 shows an exemplary main power and thermal chamber main panel (control panel) 17 used with an exemplary system such as shown in FIG. 1. In particular, FIG. 2 shows a partial view of a programmable control panel for controlling the thermal or temperature controlled test chamber (e.g., TTC 3). A number of exemplary controls are provided including a pilot 21A, circulator 21B, heat 21C, cool 21D, light 21E, internal dry air (auto-off-manual selector) 21F, external dry air (auto-off-manual selector) 21G, and refrigeration trip/reset (start or breaker trip) 21H.

Figure 3:
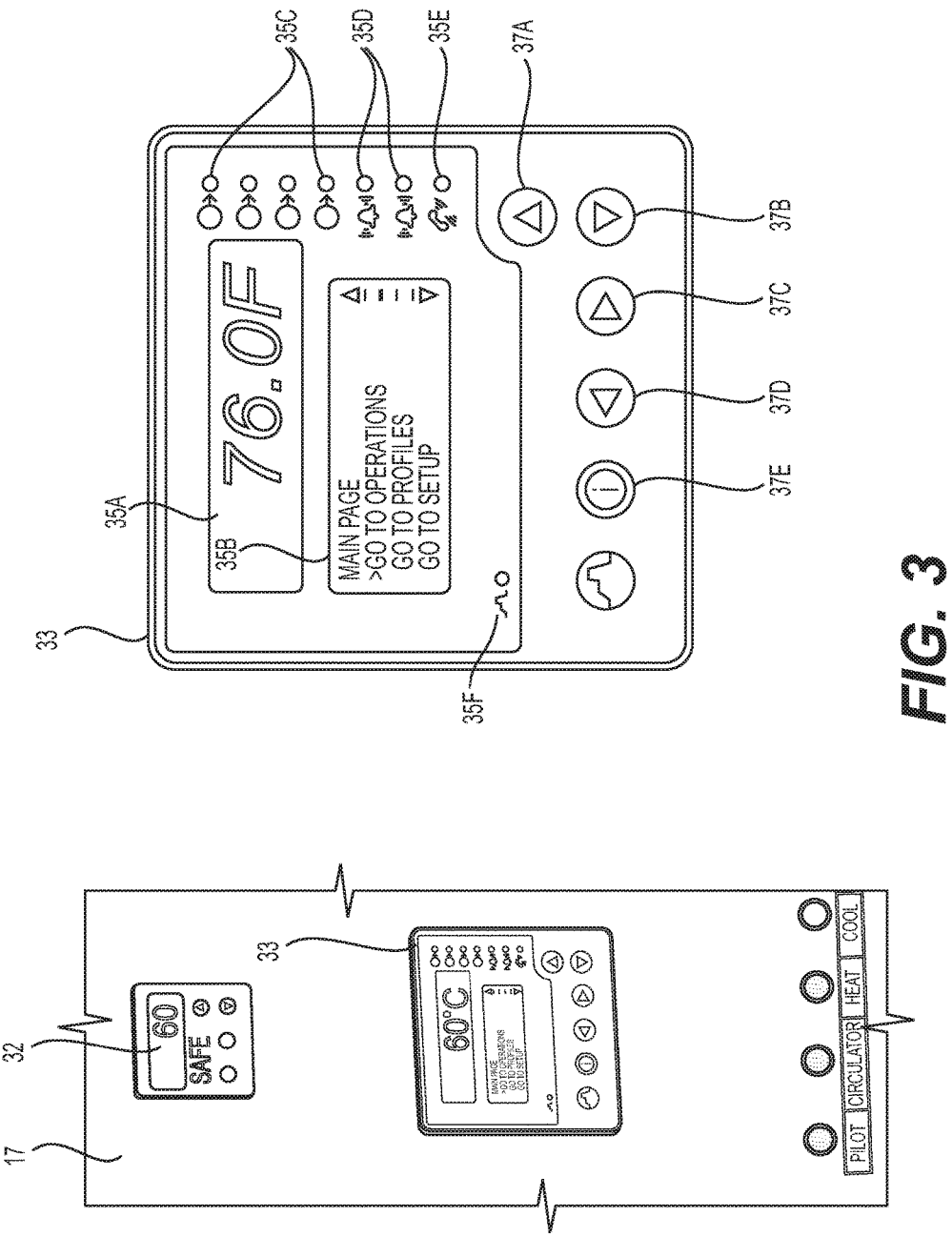
FIG. 3 shows an exemplary thermal chamber controller, control panel, and control display used with an exemplary system such as shown in FIG. 1.

FIG. 3 shows an exemplary thermal chamber temperature display 32 and temperature control panel 33 used with an exemplary system such as shown in FIG. 1. In particular, this figure shows a partial view of a programmable control panel with several control panels and indicators for controlling thermal or temperature controlled test chamber (e.g., TTC 3). The thermal chamber temperature display 32 displays the current temperature inside of TTC 3. On the temperature control panel 33 is an upper display interface 35A which shows process information, (e.g., temperature), and a lower display interface 35B that shows user selection menu options including operations, profiles, setup etc. that is navigated by a up 37A, down 37B, next 37C, and back scroll push buttons 37D. A series of temperature options, such as upper and lower temperature limits and duration of temperature phase, can be manually entered using the navigation buttons or can be programmed to automatically change the TTC temperature to desired temperatures for set periods of time as part of a temperature profile. A series of status indicators is provided on the temperature control panel 33 including output status indicator 35C, alarm status indicator 35D, communication status indicator 35E, and profile light run/hold status indicator 35F. Other interface options are also provided including an information key 37E which provides information on various menu option choices or selected parameters.

Figure 4:
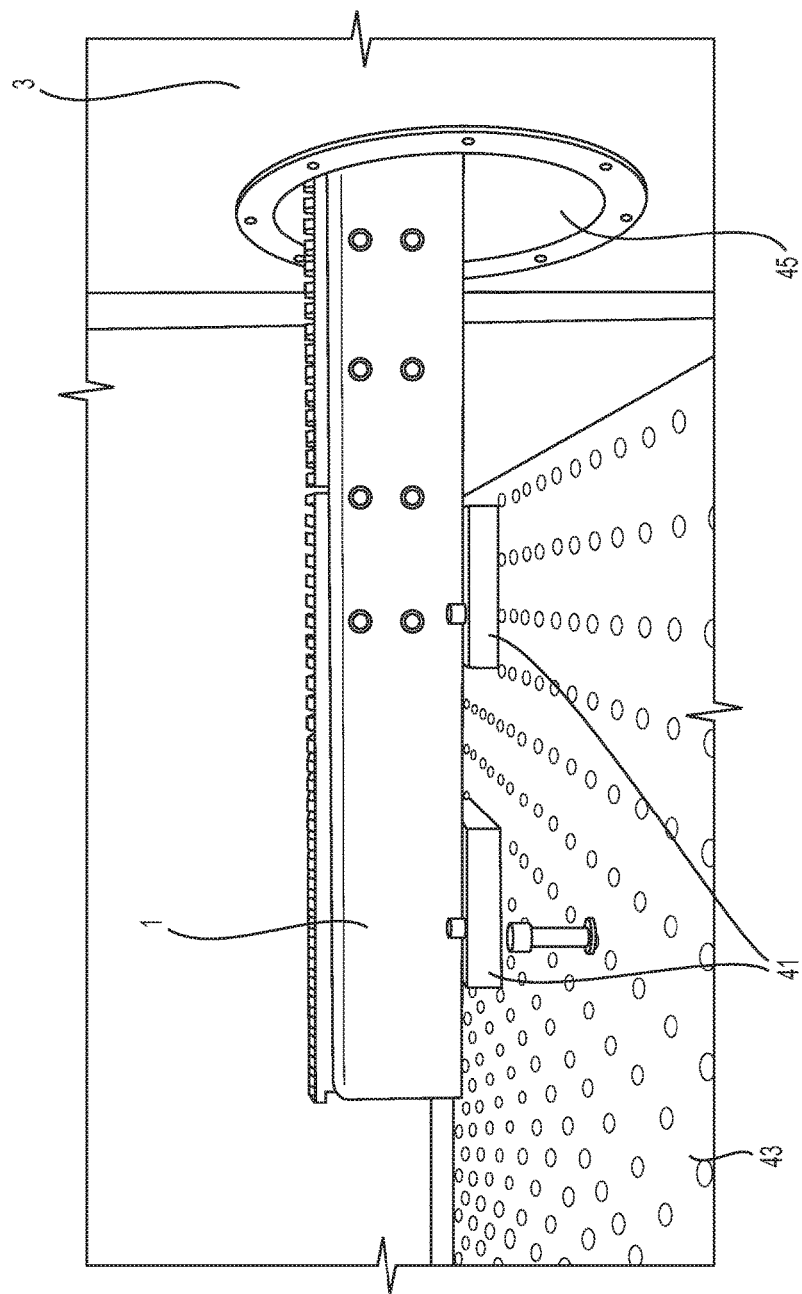
FIG. 4 shows an exemplary optional optical table and mounting rail (e.g., Invar (e.g., FeNi36) material mounting rail) used with an exemplary system such as shown in FIG. 1.

FIG. 4 shows an exemplary optional optical table and mounting rail used with an exemplary system such as shown in FIG. 1. In particular, FIG. 4 shows an optical table 43 that receives and supports Invar mounting rail 1 via mounting feet 41. Other embodiments can use alternative table designs and materials, e.g. a wooden box with an Invar mounting rail 1. Invar mounting rail 1 passes into TTC 3 through a TTC mounting rail access aperture 45 formed in TTC 3. The optical table 43, in at least some embodiments, can include or form a vibration control platform that is used to support systems used for laser and optics related experiments, engineering and manufacturing. Surfaces of these optical tables can be designed to be very rigid with minimum deflection so that the alignment of optical elements remains stable over time which provides functions such as vibration reduction.

Figure 5:
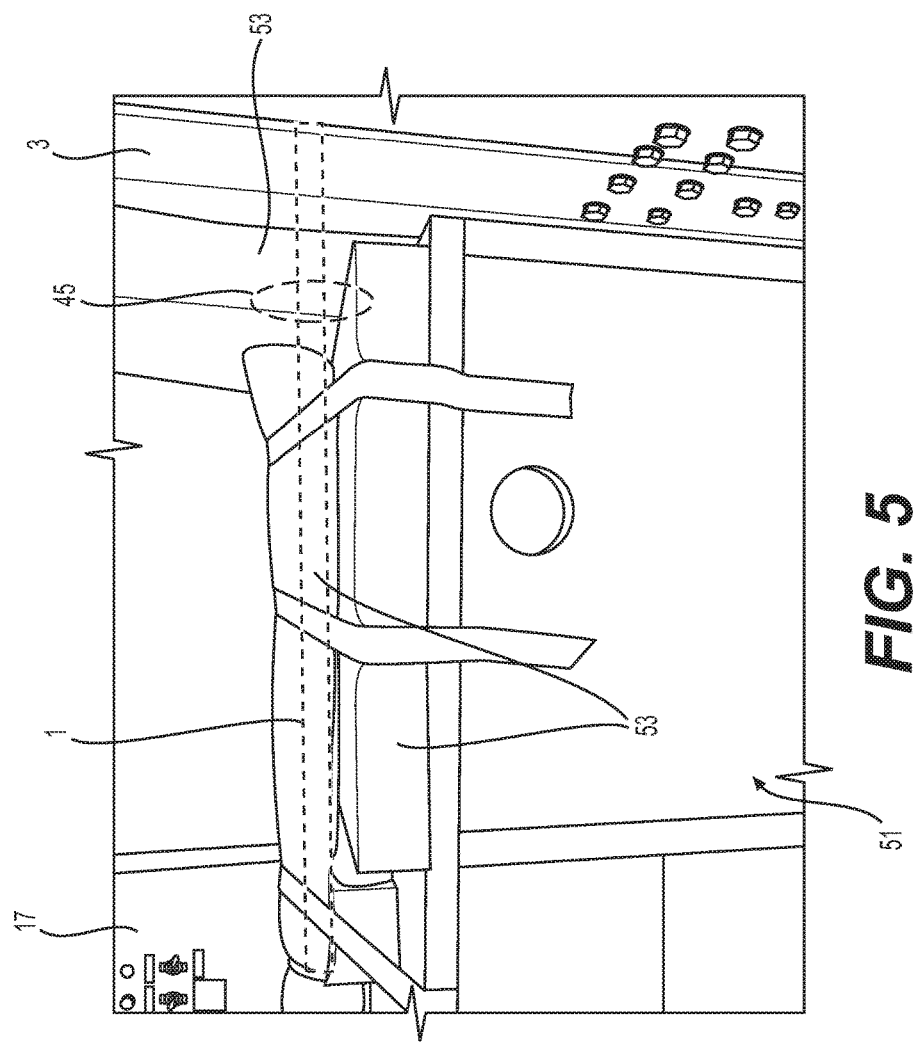
FIG. 5 shows an exemplary insulated mounting rail on an exemplary platform such as shown in FIG. 1.

FIG. 5 shows an exemplary insulated mounting rail on an exemplary platform such as shown in FIG. 1. In particular, FIG. 5 shows foam insulation 53 that provides temperature insulation and covers Invar mounting rail 1, TTC mounting rail access aperture 45, and a portion of TTC 3 to provide a barrier to thermal energy. In lieu of an exemplary optical table (see FIG. 4, 43) a mounting table 51 may be used when attributes of an optical table 43 are not required. Control panel 17 (see FIGS. 2 and 3) provides control functions for TTC 3.

Figure 6:
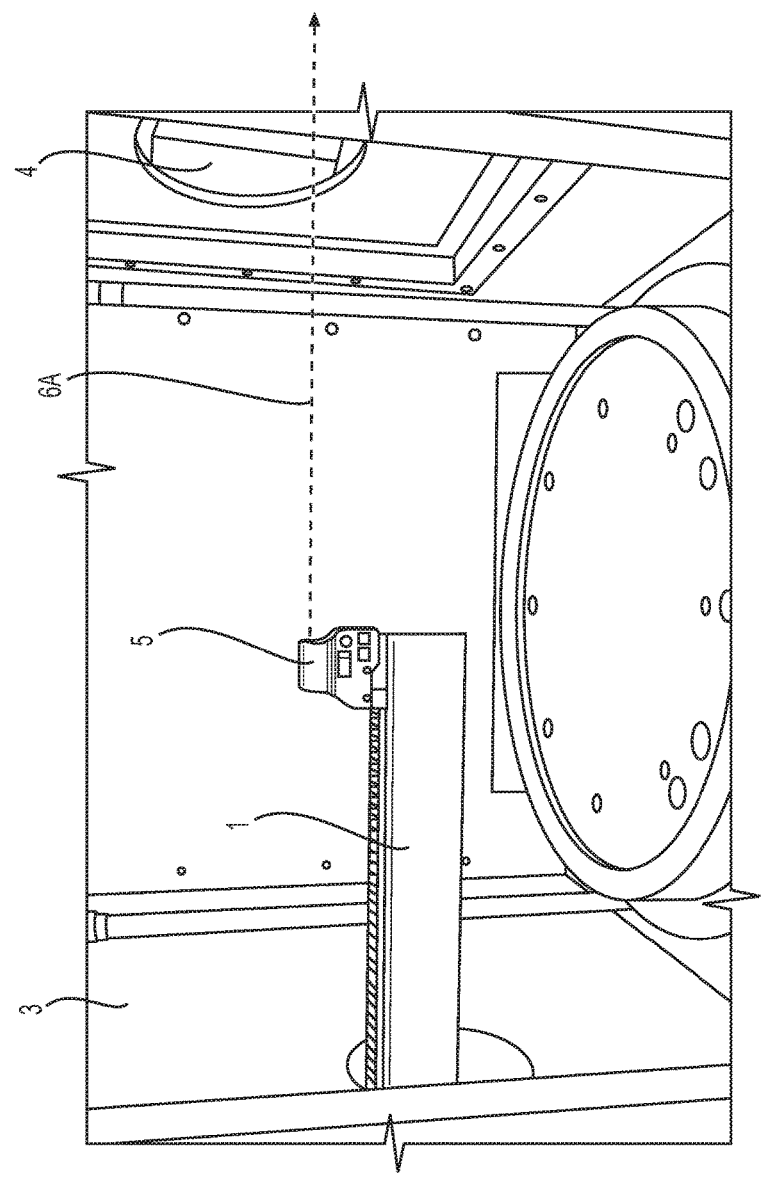
FIG. 6 shows an internal view of an exemplary thermal chamber with an open side door (not shown), mounting rail, UUT (e.g., reflexive sight with red dot laser reticle), and window for an optical path from the unit under test.

FIG. 6 shows an internal view of an exemplary TTC 3 with an open side door (not shown), mounting rail 1, UUT 5 (e.g., reflexive sight with red dot laser reticle), and glass window 4 for an optical path from the UUT 5. A first optical path segment 6A extends from the TTC to the collimator (not shown).

Figure 7:
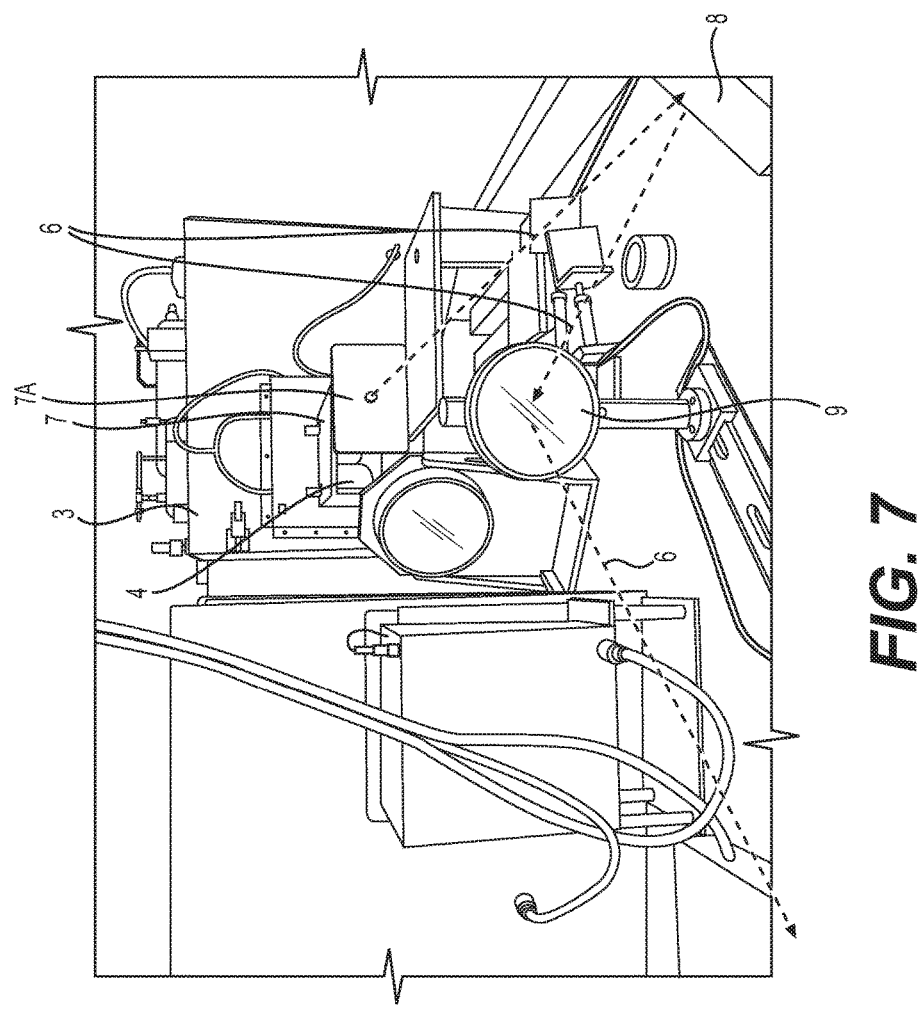
FIG. 7 shows an exemplary test system, such as shown in simplified FIG. 1, with an outside view of thermal chamber, dry air expansion chamber with open dry air expansion chamber door, optical path, collimator, and reflecting mirror.

FIG. 7 shows an exemplary test system, such as shown in simplified FIG. 1, with an outside view of TTC 3, dry air expansion chamber 7 with open dry air expansion chamber door 7A, glass window 4, optical path 6, collimator 8, and reflecting mirror 9.

Figure 8:
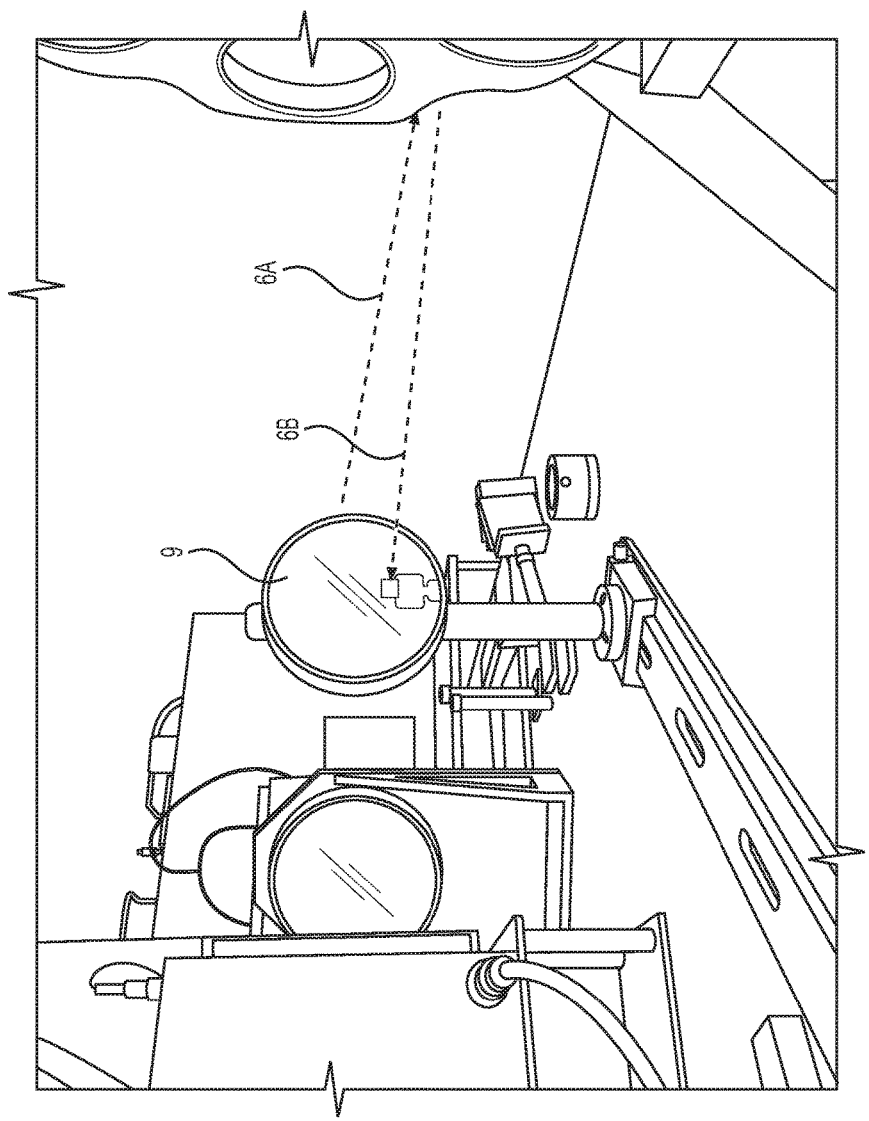
FIG. 8 shows a partial view of the FIGS. 1 and 7 test system from in front of a camera point of view of an exemplary red dot on a reflecting mirror resulting from optical path segments.

FIG. 8 shows a partial view of the FIGS. 1 and 7 test system from a camera point of view of an exemplar light beam (shown as a red dot) reflecting on reflecting mirror 9, a first optical path segment 6A for the light beam between a UUT (not shown) and collimator (not shown), and a second optical path segment 6B for the light beam between the collimator 8 and the reflecting mirror 9. The light beam associated with the red laser dot shown in reflecting mirror 9 is aligned with a third optical path segment (not directly shown) of the light beam between the mirror 9 and a camera (not shown).

Figure 9:
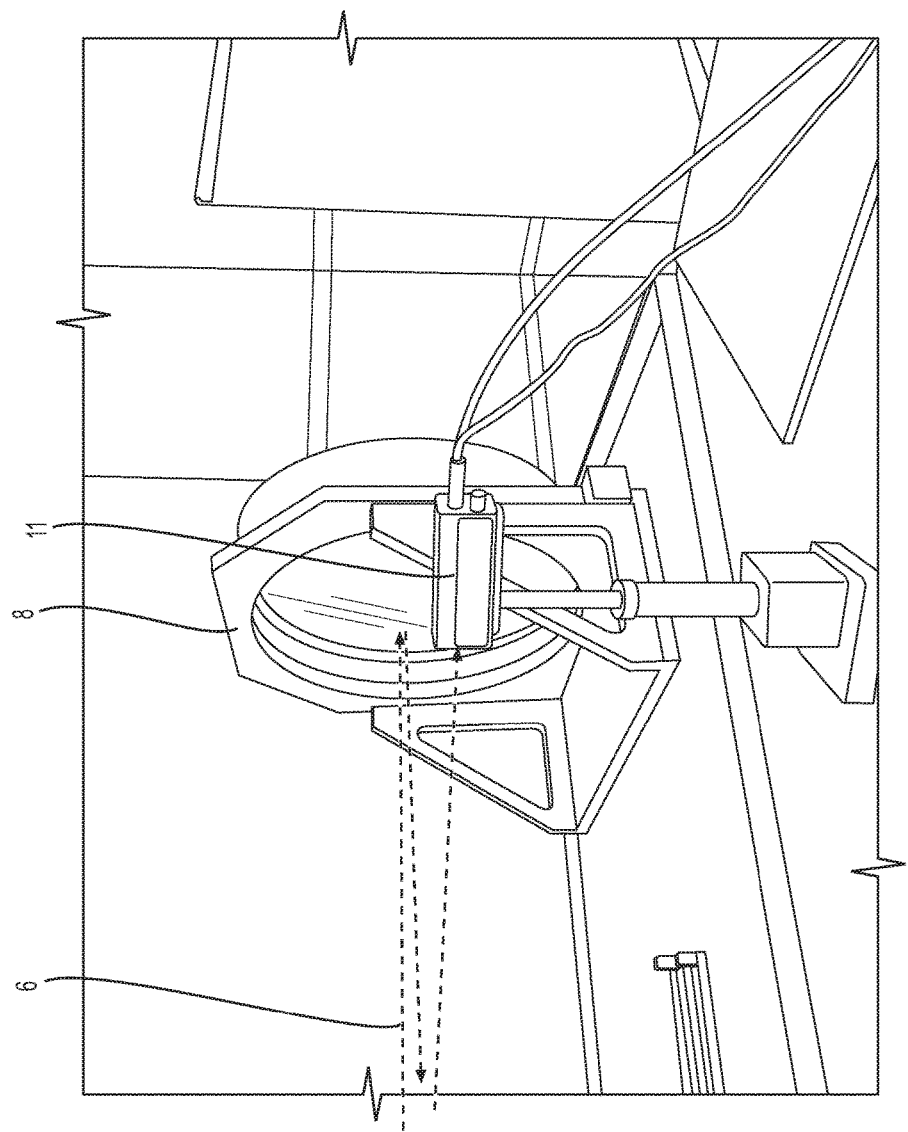
FIG. 9 shows a camera at a receiving position for exemplary optical path at focal length and the exemplary FIGS. 1, and 7 collimator mirror.

FIG. 9 shows a view of an exemplary test system such as in FIG. 1. In particular, FIG. 9 shows a camera 11 at a receiving position for exemplary optical path 6 at focal length and a collimator mirror 8.

Figure 10:
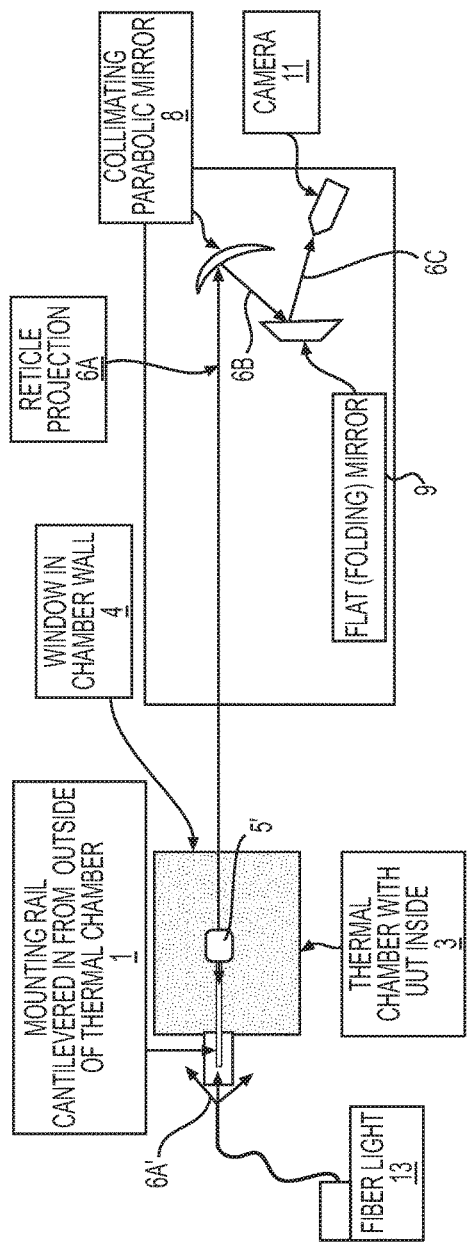
FIG. 10 shows an exemplary system for testing UUTs using a fiber light to create an optical path in accordance with an alternative embodiment of the invention.

FIG. 10 shows an exemplary system for testing UUTs in accordance with an alternative embodiment of the invention such as FIG. 1. This exemplary system includes common elements of previous embodiments (e.g. FIG. 1), including a mounting rail 1, TTC 3, glass window 4, collimator 8, reflective mirror 9, and camera 11. In addition, this exemplary system includes a UUT 5', which can be a magnified optical sight with an internal reticle UUT 5'. The UUT 5' is aligned such that an objective lens of the UUT 5' is facing the collimator 8. In this embodiment, the UUT 5' is back-lit with a fiber light 13 such that the fiber light 13 creates a beam including a first optical path segment 6A', which is projected to fill an exit pupil of the UUT 5' and propagates into the eyepiece of the UUT 5'. The optical path segment 6A' projects a collimated shadow of subtension of the reticle within the UUT 5', wherein the collimated shadow forms an optical path segment 6A, out the UUT's 5' objective lens into a dry air expansion chamber 7 coupled to the TTC 3. A second optical path segment 6A of the beam from the fiber light 13 is further directed onto an open air reflexive collimator mirror 8 and so as to result in forming of a third optical path segment 6B that is reflected into a flat reflecting mirror 9. The reflecting mirror 9 then directs or forms a fourth optical path segment 6C into a video or digital camera 11.

Figure 11:
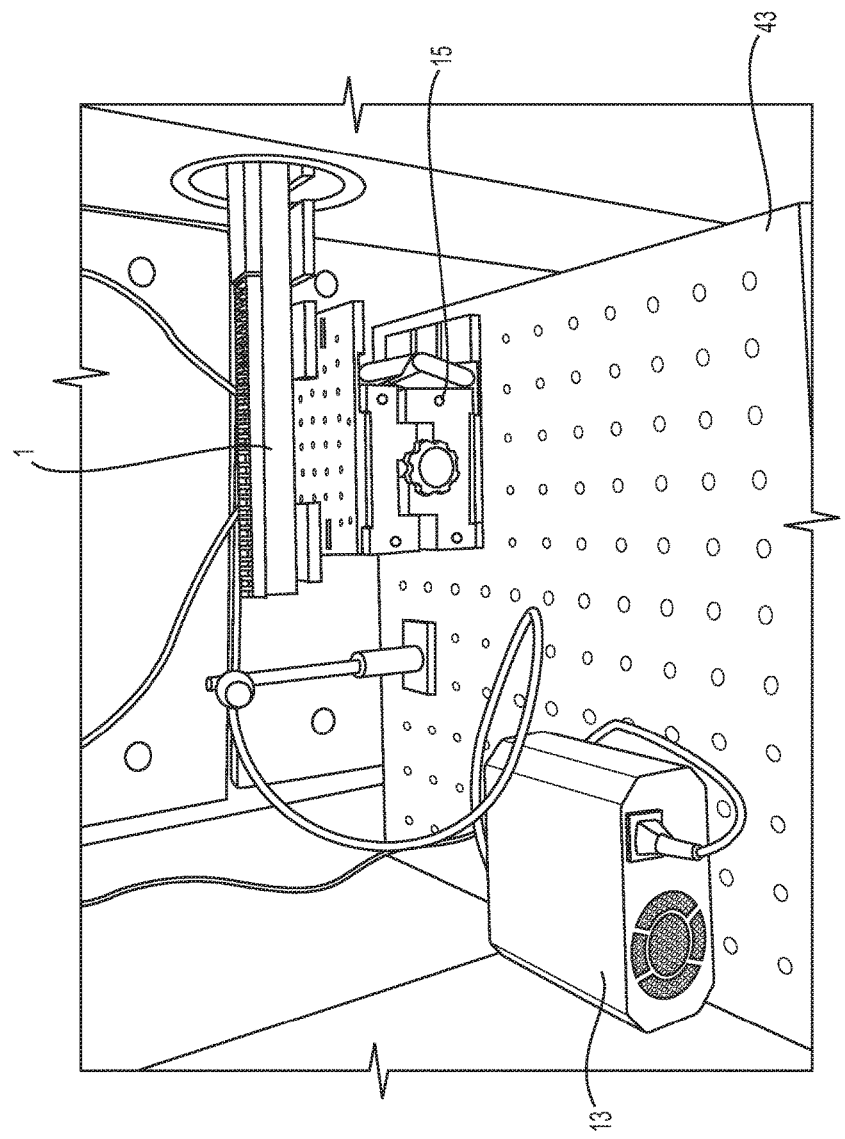
FIG. 11 shows an exemplary an optional optical table, a mounting rail, and a fiber light used with an exemplary system such as shown in FIG. 10.

FIG. 11 shows an exemplary optional optical table 43, a mounting rail 1, and a fiber light 13 used with an exemplary system such as shown in FIG. 10. In particular, FIG. 11 shows the optical table 43 that receives and supports the mounting rail 1 via a scissor lift 15. The scissor lift 15 allows the elevation of the mounting rail to be adjusted. Other embodiments can use alternative methods of supporting the mounting rail 1, such as mounting feet.

Figure 12:
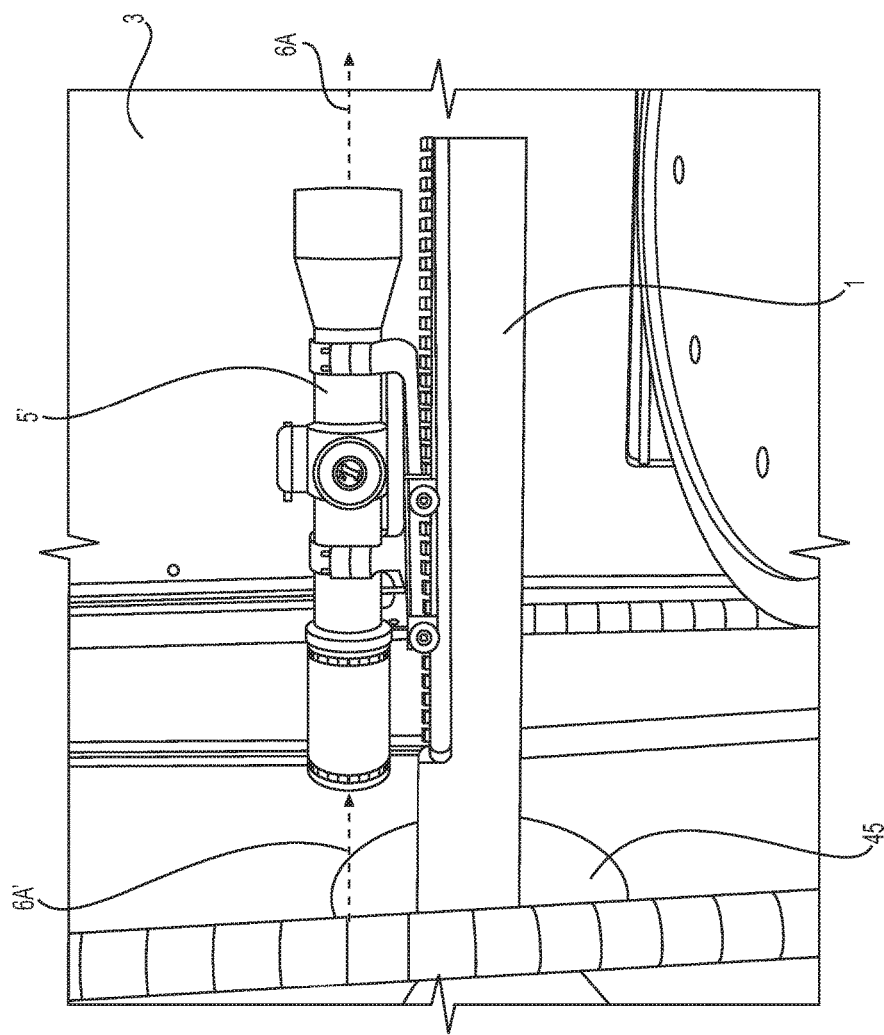
FIG. 12 shows an internal view of an exemplary thermal chamber used with an exemplary system as shown in FIG. 10 with a mounting rail and UUT.

FIG. 12 shows an internal view of an exemplary TTC 3 with a mounting rail 1 passing through a mounting rail access aperture 45 and a UUT 5'. A first optical path segment 6A' enters the TTC 3 through the mounting rail access aperture 45 and enters the UUT 5' as shown in FIG. 10. A second optical path segment 6A leaves the UUT 5' as shown in FIG. 10.

Figure 13:
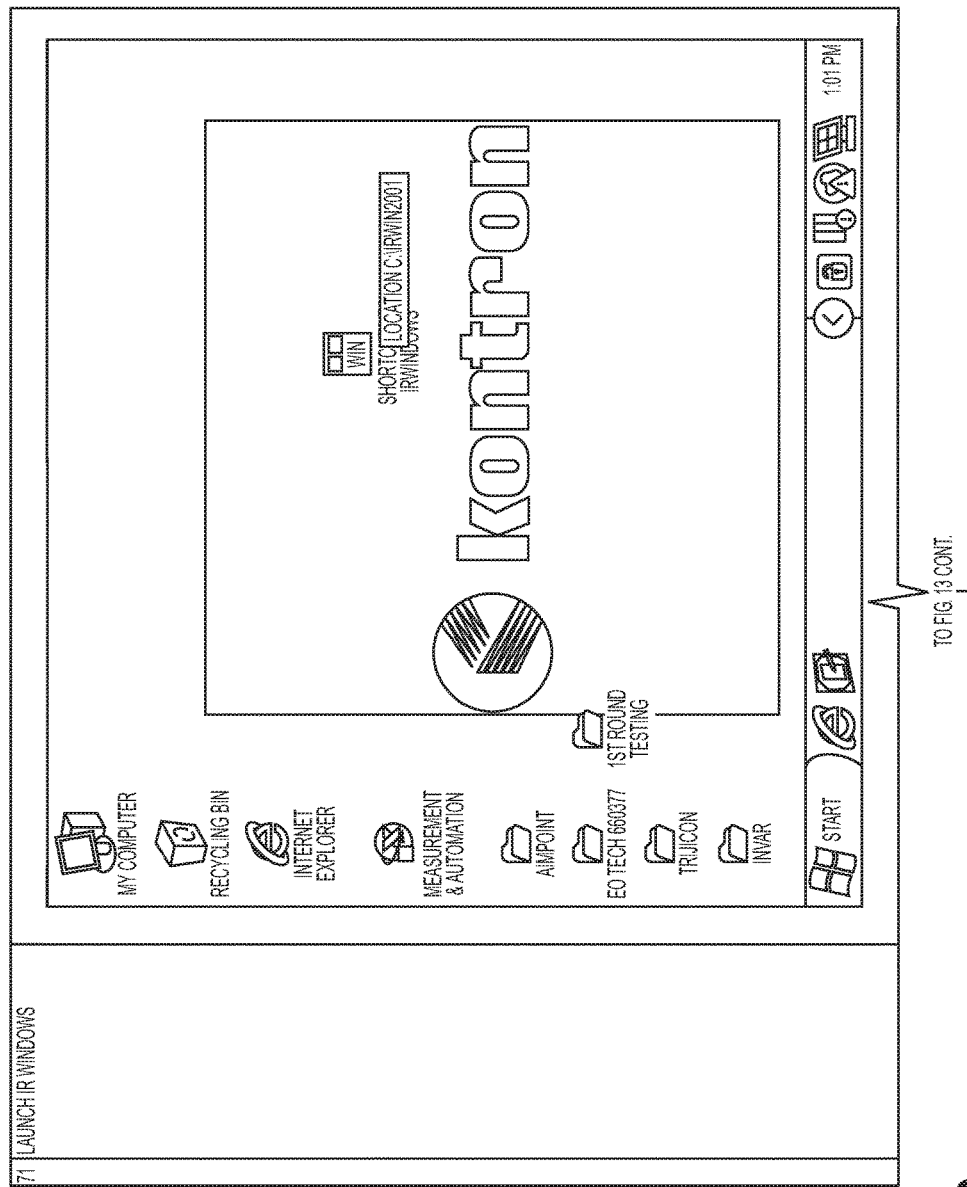
FIG. 13 shows exemplary processing sequences associated with an exemplary testing system, e.g., thermal drifting testing system, including launch of image capture software, e.g., IRWin®, in accordance with one exemplary embodiment of the invention.
Figure 13:
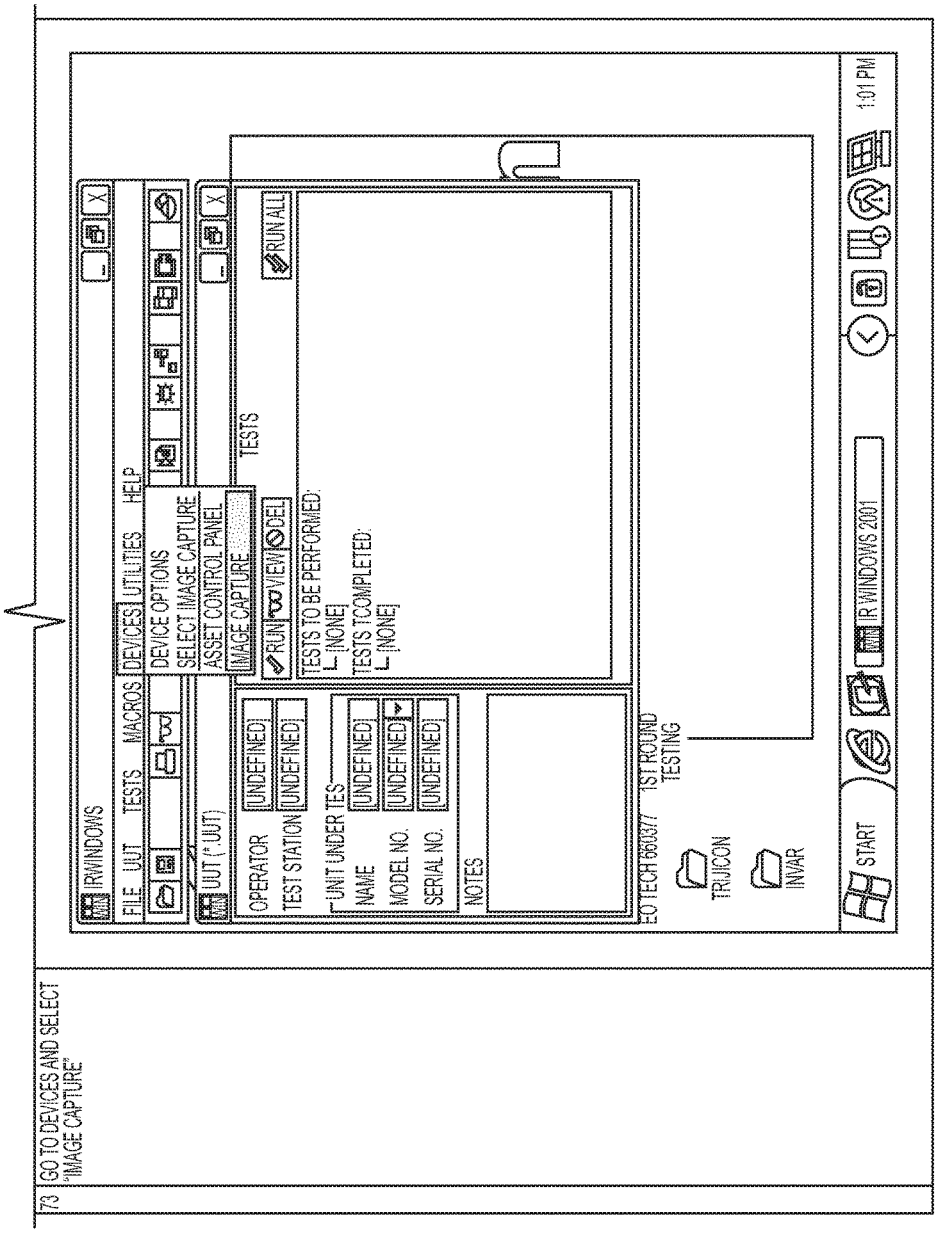

FIG. 13 shows exemplary processing sequences associated with an exemplary testing system, e.g., thermal drifting testing system, including launch of image capture software, e.g., IRWin®, in accordance with one exemplary embodiment of the invention. At step 71: launch IRWin®; at step 73 go to devices and select image capture.

Figure 14:
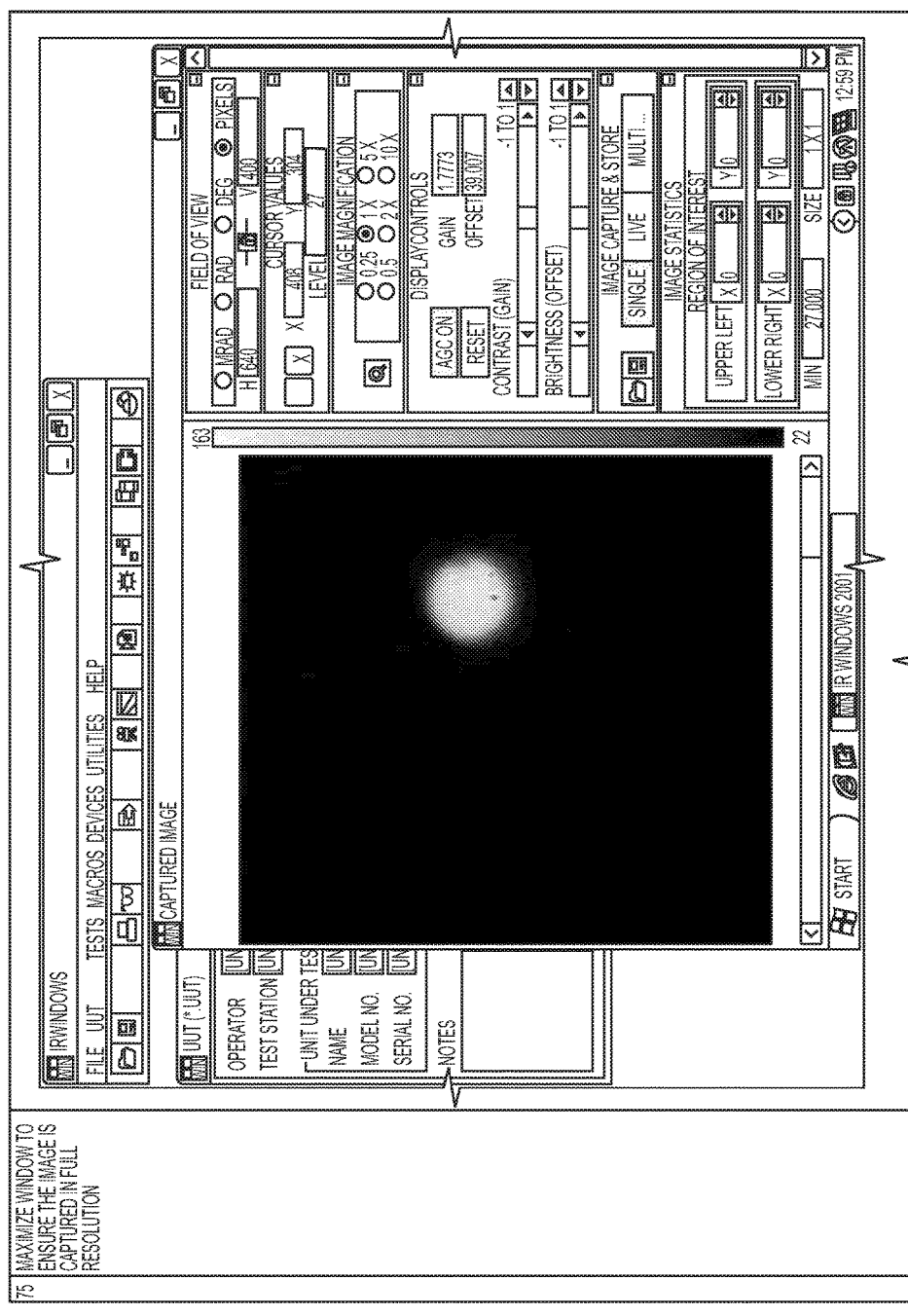
FIG. 14 show a continuation of the exemplary FIG. 13 processing sequences including operating and adjusting image capture in accordance with one exemplary embodiment of the invention.
Figure 14:
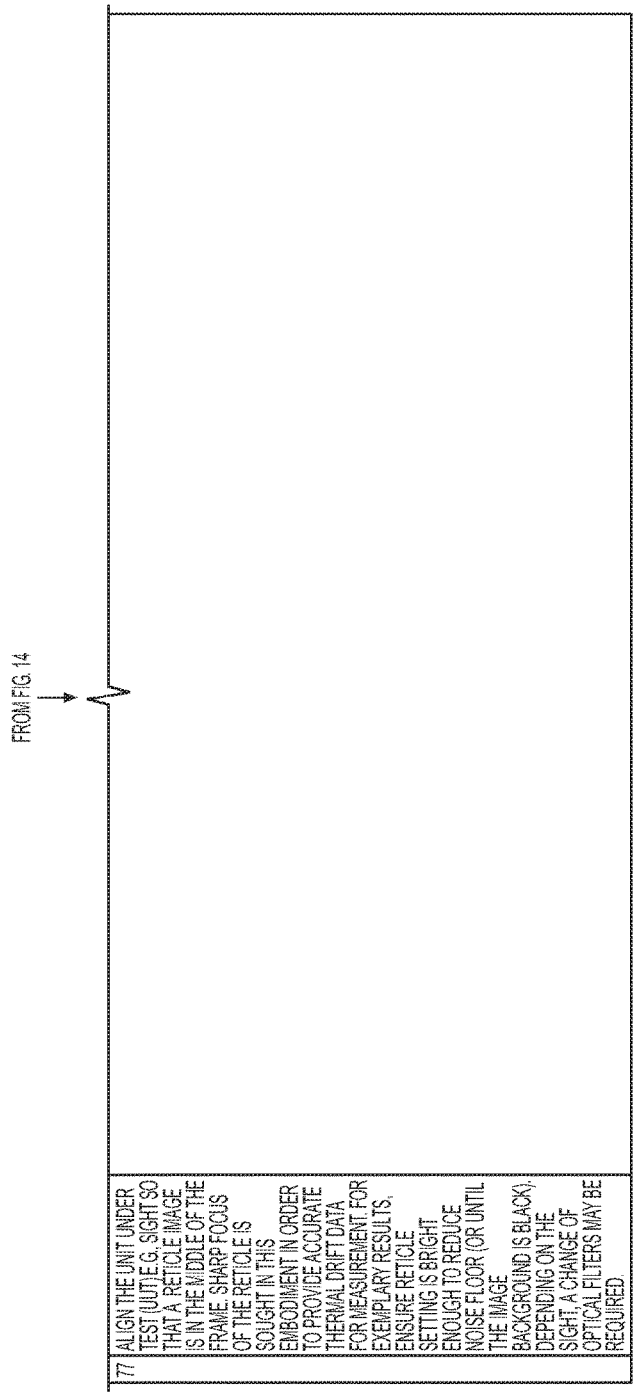

FIG. 14 show a continuation of the exemplary FIG. 13 processing sequences including operating and adjusting image capture in accordance with one exemplary embodiment of the invention; at step 75, maximize an image capture window to ensure image capture is captured in a full or predetermined resolution; at step 77 align the UUT e.g., sight so that a reticle image is in a middle of the image capture window's frame. Sharp focus of the reticle is sought in this embodiment in order to provide accurate thermal drift data for measurement. For best exemplary results in this embodiment, ensure the reticle setting is bright enough to reduce the noise floor (or until the image background is black). Depending on the sight, a change of optical filters may be required.

Figure 15:
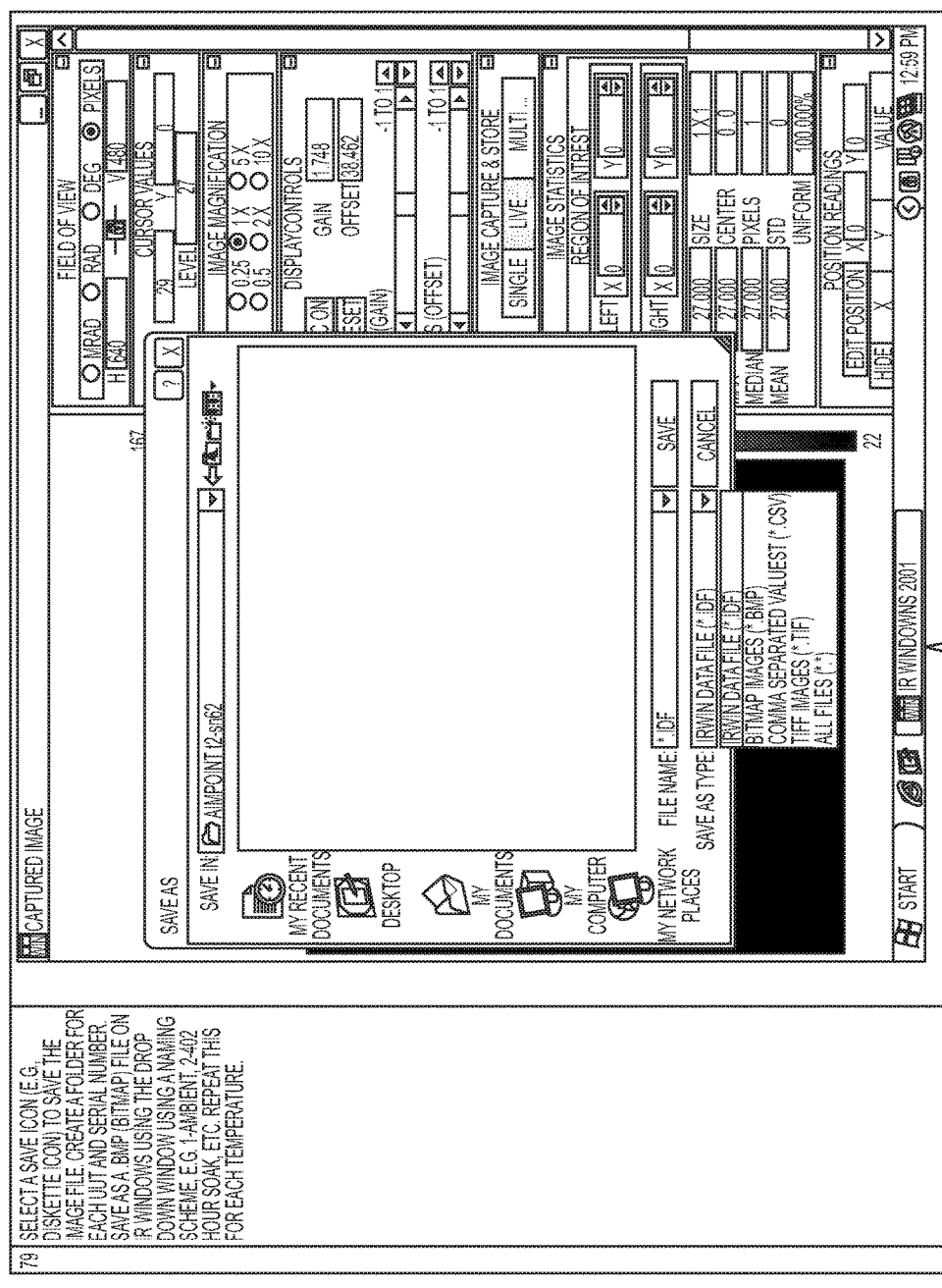
FIG. 15 shows a continuation of the exemplary FIGS. 13 and 14 processing sequences including capturing and saving images of a UUT aiming system, e.g., reflexive sight.
Figure 15:
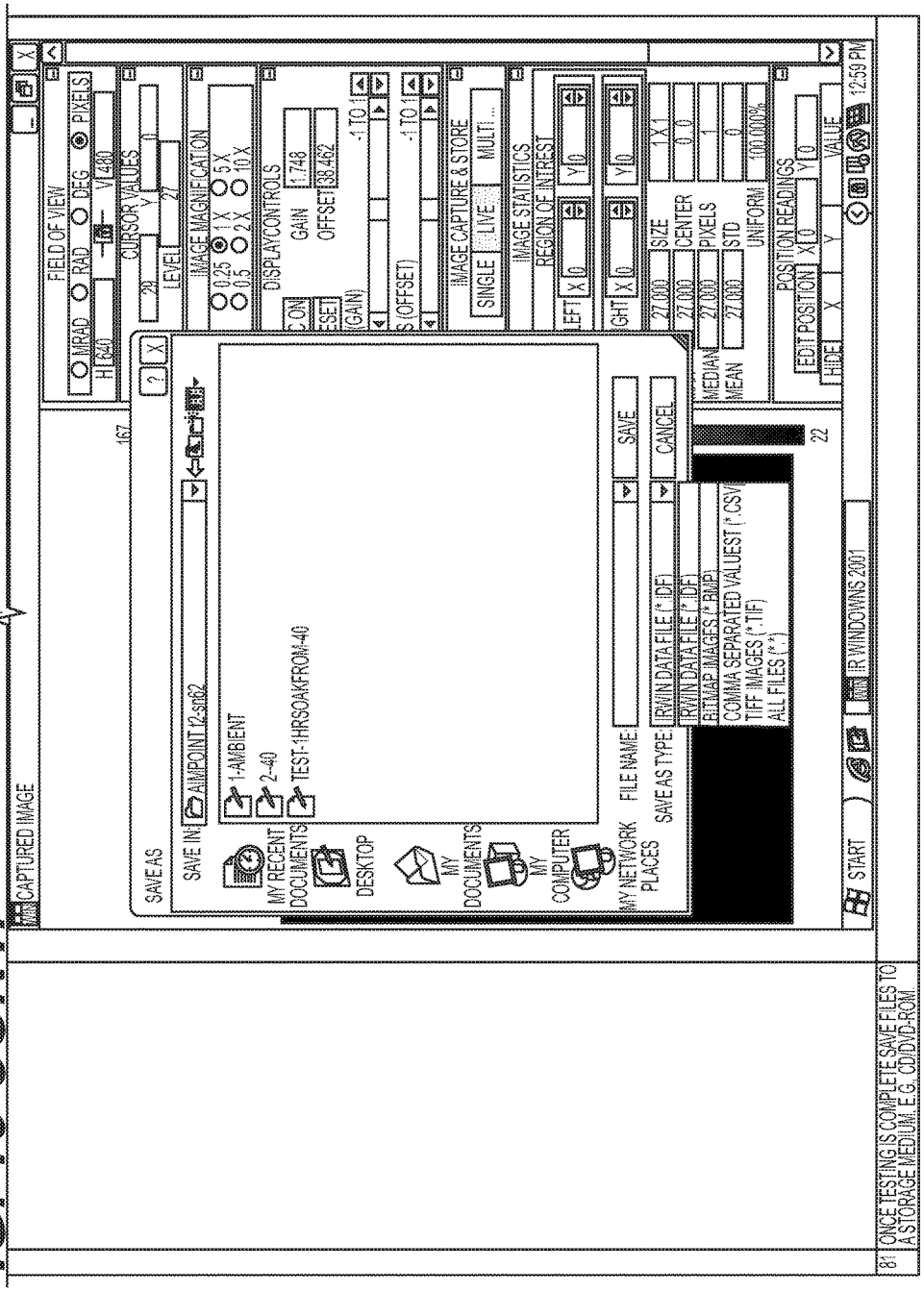

FIG. 15 shows a continuation of the exemplary FIGS. 13 and 14 processing sequences including capturing and saving images of a UUT aiming system, e.g., reflexive sight. At step 79, for each temperature, select a save icon (e.g., diskette icon) to save the image file. Create a folder for each UUT and serial number. Save as a .BMP (bitmap) file on IR Windows using the drop down window using a naming scheme, e.g. 1-Ambient, 2-402 hour soak, etc. At step 81, save files to a storage medium once testing is complete.

Figure 16:
FIG. 16 shows a continuation of the exemplary FIG. 13-15 processing sequences including operating image processing software (e.g., MatLab®)—e.g., eliminate noise, determine center of reticle dot in image, compare multiple images captured with sight at different temperatures to show any movement of sight's reticle dot (thermal drift).

FIG. 16 shows a continuation of the exemplary FIGS. 13-15 processing sequences including operating image processing software (e.g., MatLab®)—e.g., eliminate noise, determine center of reticle dot in image, compare multiple images captured with sight at different temperatures to show any movement of sight's reticle dot (thermal drift). At step 83, download bitmap file to a working directory on a computer with MatLab®. At step 85, running MatLab® script, launch Thermaldriftfinal.m. At step 87, Rename the defaultDir in the code to match selected working directory. At step 89, Select the Run function option on the top of the screen. Alternately press F5 to run the code. At step 91, An 'Input Data?' window will appear. Select the working folder created. At step 93, the MatLab® code will auto-generate all files and provide output files as necessary.

Figure 17A:
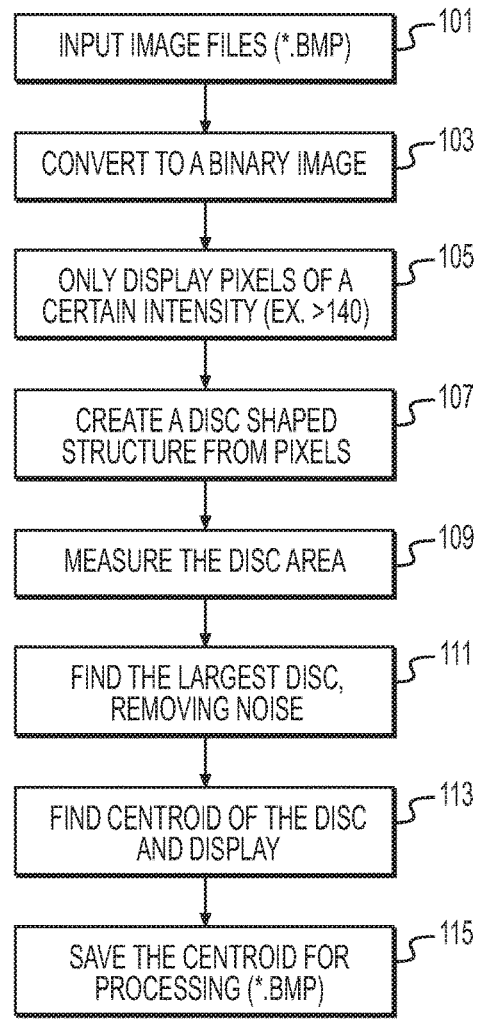
FIG. 17A shows an exemplary flow chart of processing image data to produce an image for a thermal drift report, as represented in step 85 of FIG. 16.

FIG. 17A shows an exemplary flow chart of processing image data to produce an image for a thermal drift report, as represented in step 85 of FIG. 16. At step 101, input image files. At step 103, convert to a binary image by assigning a binary value to each pixel based on brightest (e.g., assigning a "1" to the brightest 30% of the image). At step 105, display only pixels of a certain intensity (e.g., retaining the pixels assigned as "1"). At step 107, create a disc shaped structure from pixels. At step 109, measure the disc area. At step 111, find the largest disc, removing noise. At step 113, find a centroid of the disc and display. At step 115, save the centroid for processing.

Figure 17B:
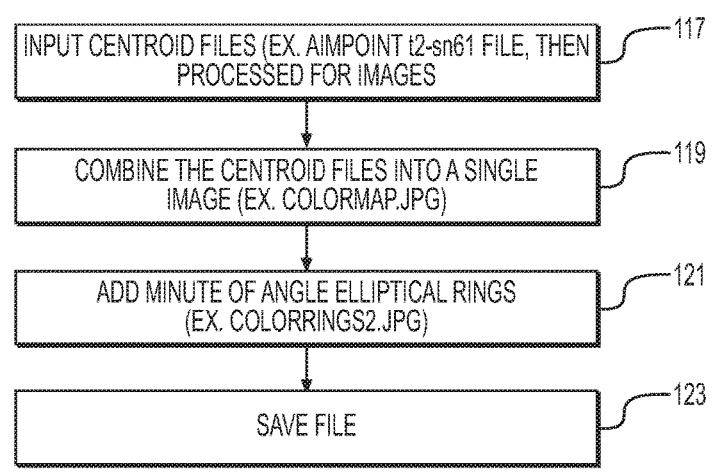
FIG. 17B shows an exemplary flow chart of processing image data to produce an image for a thermal drift report.

FIG. 17B shows an exemplary flow chart of processing image data to produce an image for a thermal drift report. At step 117, input centroid files, e.g., Aimpoint t2-sn61 file. At step 119, combine the centroid files into a single image, e.g. colormap.jpg. At step 121, add minute of angle elliptical rings. At step 123, save file.

Figure 18:
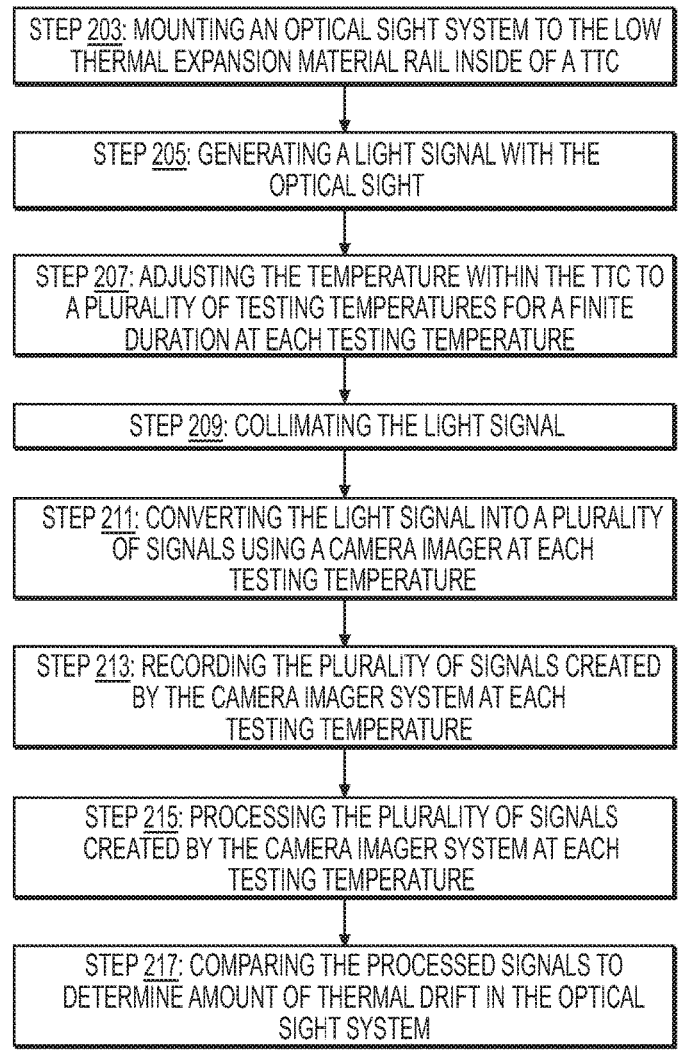
FIG. 18 shows an exemplary method of testing a UUT.

FIG. 18 shows an exemplary method of testing a UUT. At step 203, a UUT 5 is mounted to a mounting rail 1. At step 205, a light signal is generated with the UUT 5. At step 207, the temperature is adjusted using the TTC 3 to a plurality of testing temperatures for a finite duration at each temperature. At step 209, the light signal is collimated using the collimator mirror 8. At step 211, the light signal is converted into a plurality of signals using a camera imager at each testing temperature (as shown in FIGS. 13 and 14, steps 71-77). At step 213, the plurality of signals are recorded by the imager system (e.g., as shown in FIG. 15, steps 79 and 81). At step 215, the signals are processed (e.g., as shown in FIGS. 16, 17A, and 17B, steps 85 and 101-123). At step 217, the processed signals are compared to determine the amount of thermal drift. An exemplary comparison involves comparing the Cartesian coordinates of the centroids of the processed signals to determine the amount of thermal drift at the testing temperatures. The Pythagorean theorem can be used to determine the distance between the centroids ($M_{np}$) measured in the camera's pixel size. The pixel distance measurements can be converted into minutes of angle distance ($M_{n\theta}$) by the equation $M_{n\theta}=M_{np}\times\tan^{-1}(p/f)\times 3438$, where p is size of a pixel, f is the focal length of the collimator mirror 9, and 3438 is a conversion factor from radians to minutes of angle.

Figure 19:
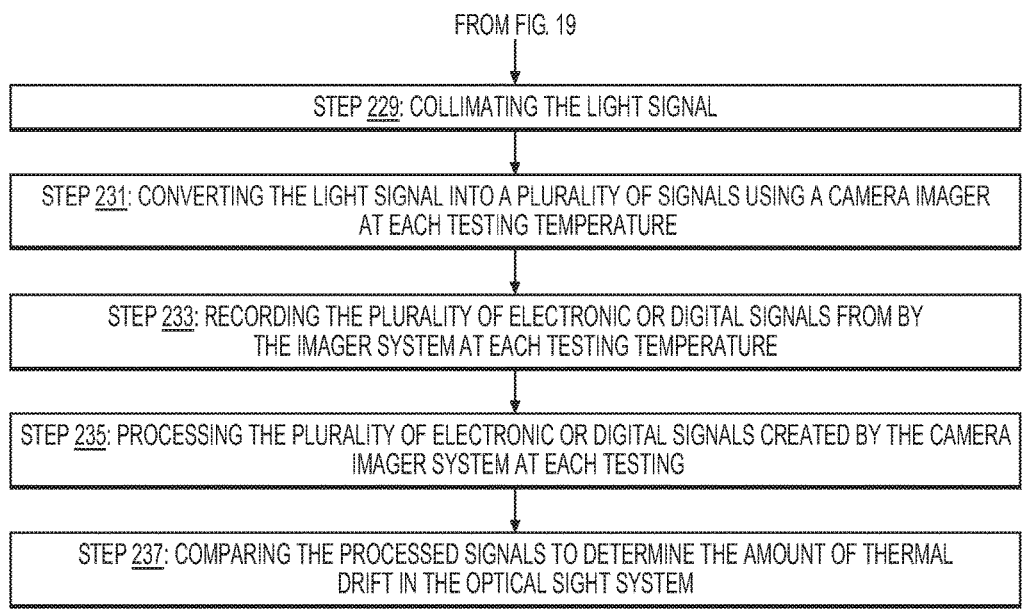
FIG. 19 shows another exemplary method of testing a UUT.

FIG. 19 shows another exemplary method of testing a UUT.

Another exemplary process can include mounting an UUT 5 to the exemplary mounting rail 1 inside the TTC 3 with the UUT's 5 ocular end facing the collimator mirror 8. Referring to FIG. 2, a next step can include configuring the TTC 3 by operating a control panel 17 including actuation of a main power switch supplying power to various elements of an embodiment and actuating control switches on the TTC 3 to an on position (e.g., see FIG. 2) and actuating a REFRIG RESET switch to start a low temperature cooler (not shown). In at least one embodiment, the TTC 3 can be configured to automatically change the temperature to predetermined testing temperatures after predetermined periods of time.

In at least some embodiments, processing can start at ambient/room temperature, input the low temperature into the controller by adjusting the up/down arrows of control panel 17 and select a first Set Point in the control panel system, then, adjust control panel system 17 to select a desired temperature setting followed by the right arrow to save the temperature. If desired, a temperature cycle/profile can be programmed into the controller. Temperature cycle/profile will start at ambient/room temperature, then down to the low temperature setting for a soak of a designated time, then up to the high temperature setting for a soak of a designated duration, and back to ambient. In this example, at each temperature soak, a reticle position will be documented with ambient as the baseline reticle position documentation. Intermediate temperature settings may also be specified.

In this example, at each temperature soak, reticle position will be documented with ambient as the baseline reticle position documentation. This can be accomplished by various methods. It may be beneficial to leave the dry air expansion chamber door closed to reduce icing and fogging. If frosting/fogging of the chamber window occurs, a heat gun on low heat can be used to defrost/defog the window to take the measurement.

Although the invention has been described in detail with reference to certain preferred embodiments, variations and modifications exist within the spirit and scope of the invention as described and defined in the following claims.

The invention claimed is:

1. A system for testing for thermal drift in an optical sight system comprising:
   a support structure;
   a low thermal expansion material rail with mounting structures coupled with the support structure, said mounting structures configured to receive and retain an optical sight system configured to generate a light signal along an optical path;
   a thermal chamber with a controls system and a heating and cooling system configured to attain and maintain a predetermined temperature in the thermal chamber, wherein the thermal chamber is configured with an aperture configured to receive and pass through a portion of the low thermal expansion material rail into the thermal chamber, said thermal chamber further comprises a transparent section adapted to permit the light signal to pass through the transparent section along the optical path;
   a dry air expansion chamber coupled or disposed in relationship to said thermal chamber and surrounding a portion of said optical path exiting said transparent section to permit said light signal to pass through said dry air expansion chamber, wherein the transparent section is configured to maintain a temperature to prevent fogging or condensation on said transparent section;
   an open air reflective collimator positioned in said optical path exiting said dry air expansion chamber and redirecting said light signal to a second optical path;
   a camera imager system configured to receive said light signal along said second optical path and convert said light signal into a plurality of electronic or digital signals; and
   a test control and processing system coupled with the camera imager system adapted to receive a plurality of electronic signals or digital signals, record said electronic signals or digital signals, and then perform image processing comprising noise reduction, locating a centroid of each image capture of said light signal, determining a thermal drift of the light signal in the image captures, and generating an output report on an output system comprising a graphic or data showing a comparison of the recorded electronic or digital signals in at least some selected image captures of said light signal.

2. The system of claim 1, wherein the support structure is an optical table.

3. The system of claim 1, wherein the thermal chamber is further configured to automatically change between predetermined temperatures and maintain the predetermined temperatures for predetermined durations.

4. The system of claim 1, wherein the low thermal expansion material rail has a coefficient of thermal expansion of less than $5 \times 10^{-6}$ $K^{-1}$.

5. A system for testing for thermal drift in an optical sight system comprising:
a support structure;
a low thermal expansion material rail with mounting structures coupled with the support structure, said mounting structures configured to receive and retain an optical sight system;
an external light source configured to generate a light signal and direct said light signal through an optical sight system retained by the mounting structures;
a thermal chamber with a controls system and a heating and cooling system configured to attain and maintain a predetermined temperature in the thermal chamber, wherein the thermal chamber is configured with an aperture configured to receive and pass through a portion of the low thermal expansion material rail into the thermal chamber, said thermal chamber further comprises a transparent section adapted to permit the light signal to pass through the transparent section along the optical path;
a dry air expansion chamber coupled or disposed in relationship to said thermal chamber and surrounding a portion of said optical path exiting said transparent section to permit said light signal to pass through said dry air expansion chamber, wherein the transparent section is configured to maintain a temperature to prevent fogging or condensation on said transparent section;
an open air reflective collimator positioned in said optical path exiting said dry air expansion chamber and redirecting said light signal to a second optical path;
a camera imager system configured to receive said light signal along said second optical path and convert said light signal into a plurality of electronic or digital signals; and
a test control and processing system coupled with the camera imager system adapted to receive a plurality of electronic signals or digital signals, record said electronic signals or digital signals, and then perform image processing comprising noise reduction, locating a centroid of each image capture of said light signal, determining a thermal drift of the light signal in the image captures, and generating an output report on an output system comprising a graphic or data showing a comparison of the recorded electronic or digital signals in at least some selected image captures of said light signal.

6. The system of claim 5, wherein the external light source is further configured to fill an exit pupil of the retained optical sight system with light, propagate the light into said optical sight system, and project a collimated shadow of subtension of a reticle within said optical sight system such that the light signal exits an objective lens of said optical sight system.

7. The system of claim 6, wherein the external light source is a fiber light.

8. The system of claim 5, wherein the thermal chamber is further configured to automatically change between predetermined temperatures and maintain the predetermined temperatures for predetermined durations.

9. The system of claim 5, wherein the support structure is an optical table.

10. The system of claim 5, wherein the low thermal expansion material rail has a coefficient of thermal expansion of less than $5 \times 10^{-6}$ $K^{-1}$.

11. A system for testing for thermal drift in an optical sight system comprising:
a support structure;
a low thermal expansion material rail with mounting structures coupled with the support structure, said mounting structures configured to receive and retain an optical sight system configured to allow an optical path to exit the optical sight system;
a thermal chamber with a controls system and a heating and cooling system configured to attain and maintain a predetermined temperature in the thermal chamber, wherein the thermal chamber is configured with an aperture configured to receive and pass through a portion of the low thermal expansion material rail into the thermal chamber, said thermal chamber further comprises a transparent section adapted to permit the light signal to pass through the transparent section along the optical path;
a dry air expansion chamber coupled or disposed in relationship to said thermal chamber and surrounding a portion of said optical path exiting said transparent section to permit said light signal to pass through said dry air expansion chamber, wherein the transparent section is configured to maintain a temperature to prevent fogging or condensation on said transparent section;
an open air reflective collimator positioned in said optical path exiting said dry air expansion chamber and redirecting said light signal to a second optical path;
a camera imager system configured to receive said light signal along said second optical path and convert said light signal into a plurality of electronic or digital signals; and
a test control and processing system coupled with the camera imager system adapted to receive a plurality of electronic signals or digital signals, record said electronic signals or digital signals, and then perform image processing comprising noise reduction, locating a centroid of each image capture of said light signal, determining a thermal drift of the light signal in the image captures, and generating an output report on an output system comprising a graphic or data showing a comparison of the recorded electronic or digital signals in at least some selected image captures of said light signal.

12. A method of testing an optical sight system for thermal drift comprising:

mounting the optical sight system to a low thermal expansion material rail located inside of a thermal chamber;
generating a light signal from the optical sight system;
adjusting the temperature inside of the thermal chamber to a plurality of testing temperatures for a finite duration at each testing temperature;
collimating the light signal received from the optical sight system;
converting the light signal into a plurality of electronic or digital signals using a camera imager system at each testing temperature;
recording the plurality of electronic or digital signals created by the camera imager system at each testing temperature;
processing the plurality of electronic or digital signals recorded at each testing temperature, said processing comprising:
converting the electronic or digital signals into binary images, wherein a brightest percentage of the image is retained and the remainder of the image is eliminated;
approximating the centroids of the binary images; and
assigning coordinate positions to the centroids of the binary images in relation to an origin point, wherein the origin point is located at the centroid of the binary image corresponding to the starting testing temperature; and
comparing the processed signals to determine the amount of thermal drift in the optical sight system.

13. The method of claim 10, wherein the assigned coordinate positions are polar coordinates.

14. A method of testing an optical sight system for thermal drift comprising:
mounting the optical sight system to a low thermal expansion material rail located inside of a thermal chamber;
generating a light signal from an external light source, wherein the external light source is configured to direct said light signal through the optical sight system retained by the mounting structures;
adjusting the temperature inside of the thermal chamber to a plurality of testing temperatures for a finite duration at each testing temperature;
collimating the light signal received from the optical sight system;
converting the light signal into a plurality of electronic or digital signals using a camera imager system at each testing temperature;
recording the plurality of electronic or digital signals created by the camera imager system at each testing temperature;
processing the plurality of electronic or digital signals recorded at each testing temperature, said processing comprising:
converting the electronic or digital signals into binary images, wherein a brightest percentage of the image is retained and the remainder of the image is eliminated;
approximating the centroids of the binary images; and
assigning coordinate positions to the centroids of the binary images in relation to an origin point, wherein the origin point is located at the centroid of the binary image corresponding to the starting testing temperature; and
comparing the processed signals to determine the amount of thermal drift in the optical sight system.

15. The method of claim 12, wherein the assigned coordinate positions are polar coordinates.

16. A method of testing an optical sight system for thermal drift comprising:
providing a testing system comprising:
a support structure;
a low thermal expansion material rail with mounting structures coupled with the support structure, said mounting structures configured to receive and retain an optical sight system configured to allow an optical path to exit the optical sight system;
a thermal chamber with a controls system and a heating and cooling system configured to attain and maintain a predetermined temperature in the thermal chamber, wherein the thermal chamber is configured with an aperture configured to receive and pass through a portion of the low thermal expansion material rail into the thermal chamber, said thermal chamber further comprises a transparent section adapted to permit the light signal to pass through the transparent section along the optical path;
a dry air expansion chamber coupled or disposed in relationship to said thermal chamber and surrounding a portion of said optical path exiting said transparent section to permit said light signal to pass through said dry air expansion chamber, wherein the transparent section is configured to maintain a temperature to prevent fogging or condensation on said transparent section;
an open air reflective collimator positioned in said optical path exiting said dry air expansion chamber and redirecting said light signal to a second optical path;
a camera imager system configured to receive said light signal along said second optical path and convert said light signal into a plurality of electronic or digital signals; and
a test control and processing system coupled with the camera imager system adapted to receive said plurality of electronic signals or digital signals, record said electronic signals or digital signals, and then perform image processing comprising noise reduction, locating a centroid of each image capture of said light signal, determining a thermal drift of the light signal in the image captures, and generating an output report on an output system comprising a graphic or data showing a comparison of the recorded electronic or digital signals in at least some selected image captures of said light signal;
mounting the optical sight system to the low thermal expansion material rail;
generating a light signal from the optical sight system;
using the thermal chamber with the controls system to adjust the temperature within the thermal chamber to a plurality of testing temperatures for a finite duration at each testing temperature;
collimating the light signal received from the optical sight system;
converting the light signal into a plurality of electronic or digital signals using a camera imager system at each testing temperature;
recording the plurality of electronic or digital signals created by the camera imager system at each testing temperature;
processing the plurality of electronic or digital signals recorded at each testing temperature, said processing comprising:

converting the electronic or digital signals into binary images, wherein a brightest percentage of the image is retained and the remainder of the image is eliminated;
approximating the centroids of the binary images; and
assigning coordinate positions to the centroids of the binary images in relation to an origin point, wherein the origin point is located at the centroid of the binary image corresponding to the starting testing temperature; and
comparing the processed signals to determine the amount of thermal drift that occurs in the optical sight system across the plurality of testing temperatures.

* * * * *